United States Patent [19]

Kameda et al.

[11] 4,158,443

[45] Jun. 19, 1979

[54] FLUID JET MACHINE

[76] Inventors: Tamotsu Kameda, 2594-5 Omiya; Yukio Kikuta, 3-12 Chuocho, both of Fujinomiya, Japan

[21] Appl. No.: 839,658

[22] Filed: Oct. 5, 1977

[30] Foreign Application Priority Data

Jun. 2, 1977 [JP] Japan .................................. 52-65189

[51] Int. Cl.² ............................................. B05B 3/18
[52] U.S. Cl. .................................... 239/184; 239/186
[58] Field of Search ............... 239/184, 185, 186, 187, 239/227; 222/176; 118/323

[56] References Cited

U.S. PATENT DOCUMENTS

| | | | |
|---|---|---|---|
| 3,286,688 | 11/1966 | Blenman | 239/186 |
| 3,383,046 | 5/1968 | Voegtly | 239/186 |
| 3,459,203 | 8/1969 | Pritchard | 239/186 |
| 3,833,175 | 9/1974 | Pulk et al. | 239/184 |
| 3,908,907 | 9/1975 | Beltran | 239/184 |

*Primary Examiner*—James B. Marbert

[57] ABSTRACT

A machine for directing fluid jets upwards to wash a vehicle or the like moves on a track under the vehicle and has a parallel link mechanism with nozzles mounted thereon for ejection of fluid, the parallel link mechanism oscillating to and fro so as to move the nozzles about the underside of the vehicle; and, optionally, the nozzles may also be swung in the fore-and-aft direction.

9 Claims, 9 Drawing Figures

FLUID JET MACHINE

This invention relates to a fluid jet machine, and particularly relates to a moving fluid jet machine including an oscillating mechanism which oscillates fluid nozzles in a horizontal direction perpendicular to the moving direction of the fluid jet machine, the nozzles, which face generally upwards, also optionally oscillating independently in the vertical plane containing the direction of motion of the machine.

When the lower part, or the bottom, of an automobile or the like is washed or coated by spraying fluid from nozzles under pressure, at present an operator holds the nozzles by hand. Accordingly, the efficiency of such an operation is very low. Furthermore, an operation of this kind often entails troublesomely high noise levels.

It is an object of the present invention to provide a fluid jet machine which enables the operator to conduct automatic, quick, and accurate operation.

This object is attained by a fluid jet machine including an oscillating mechanism comprising at least a pair of arms constituting a parallel link, the oscillating mechanism oscillating fluid nozzles attached at the moving end of the arms in a perpendicular direction to the moving direction of the fluid jet machine, the nozzles facing upwards and swinging in the direction of motion of the machine.

Other objects and advantages of the present invention will be apparent from the following description of a preferred embodiment of the invention. It will be readily appreciated that one skilled in the art can conceive of various modifications to and omissions from the features of this embodiment, which is therefore not intended to be limitative of the invention. In the accompanying drawings.

Figure 1:
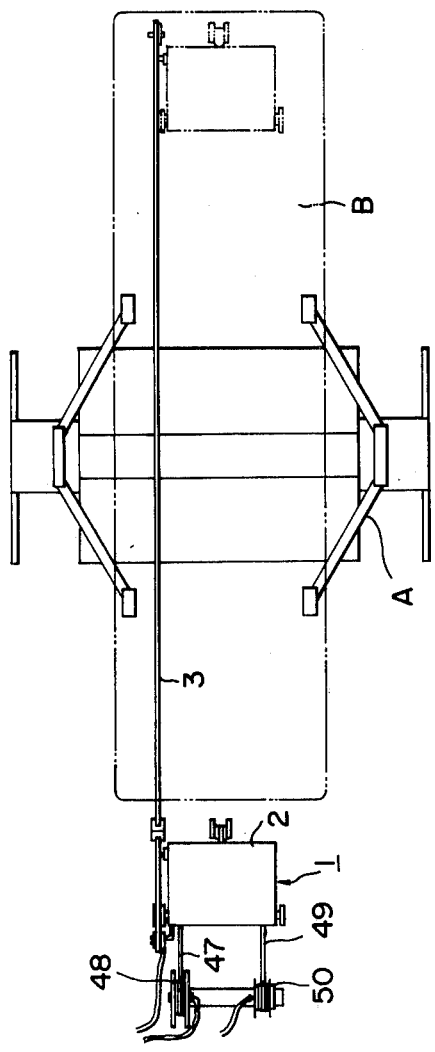
FIG. 1 is a plan view in which a fluid jet machine according to the present invention is installed for use.
Figure 2:
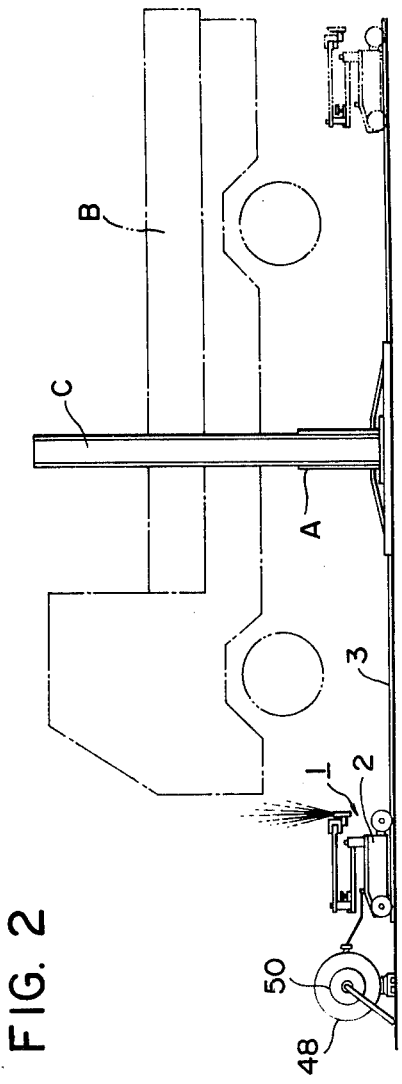
FIG. 2 is a side view of the set-up shown in FIG. 1.

Referring now to FIGS. 1 and 2 of the drawings, there is shown a vehicle lifted up by a lift A between two supports C. A fluid jet machine 1 moves under the vehicle B along a guide rail 3.

Figure 3:
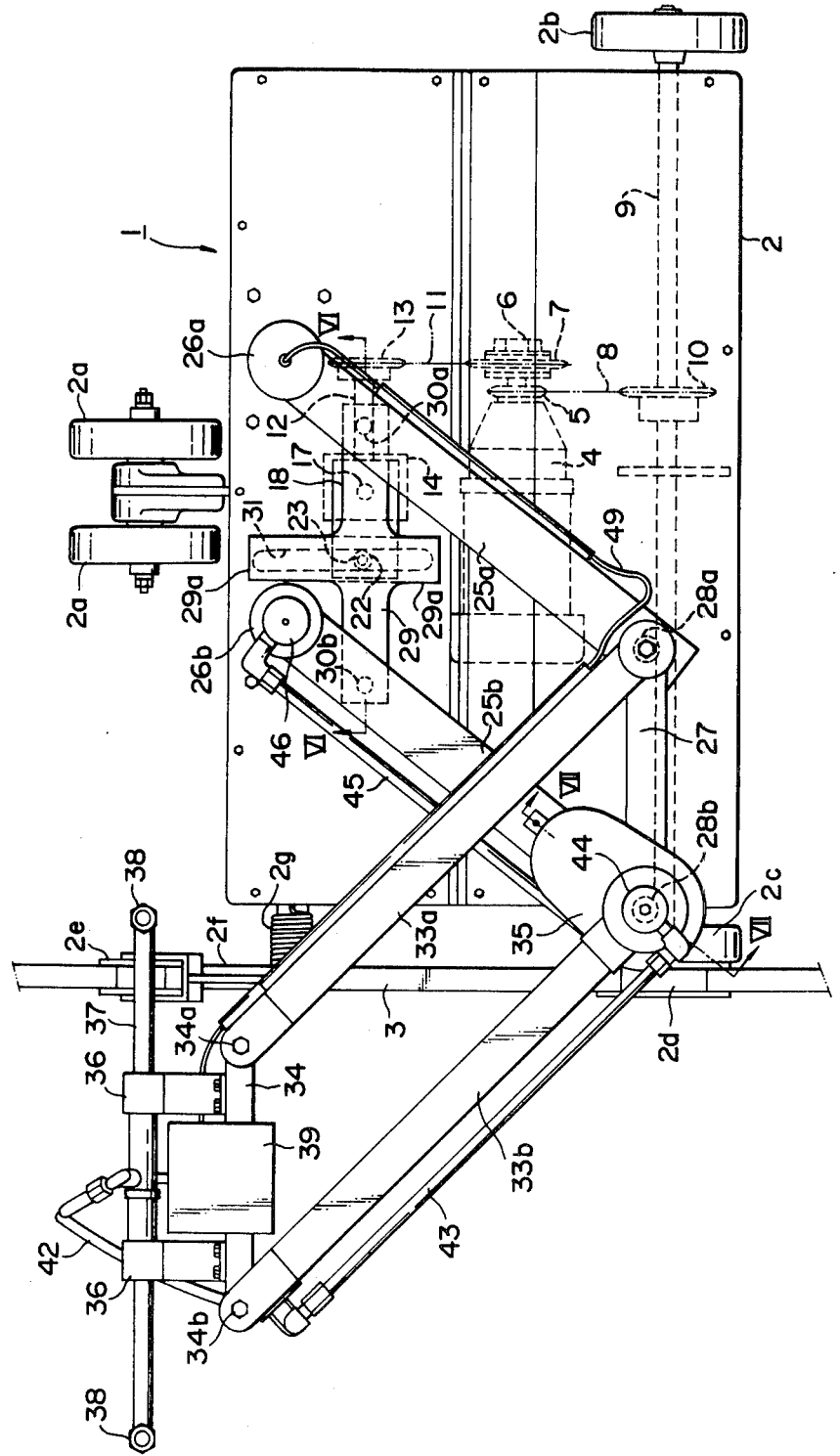
FIG. 3 is a plan view of the fluid jet machine according to the present invention.
Figure 4:
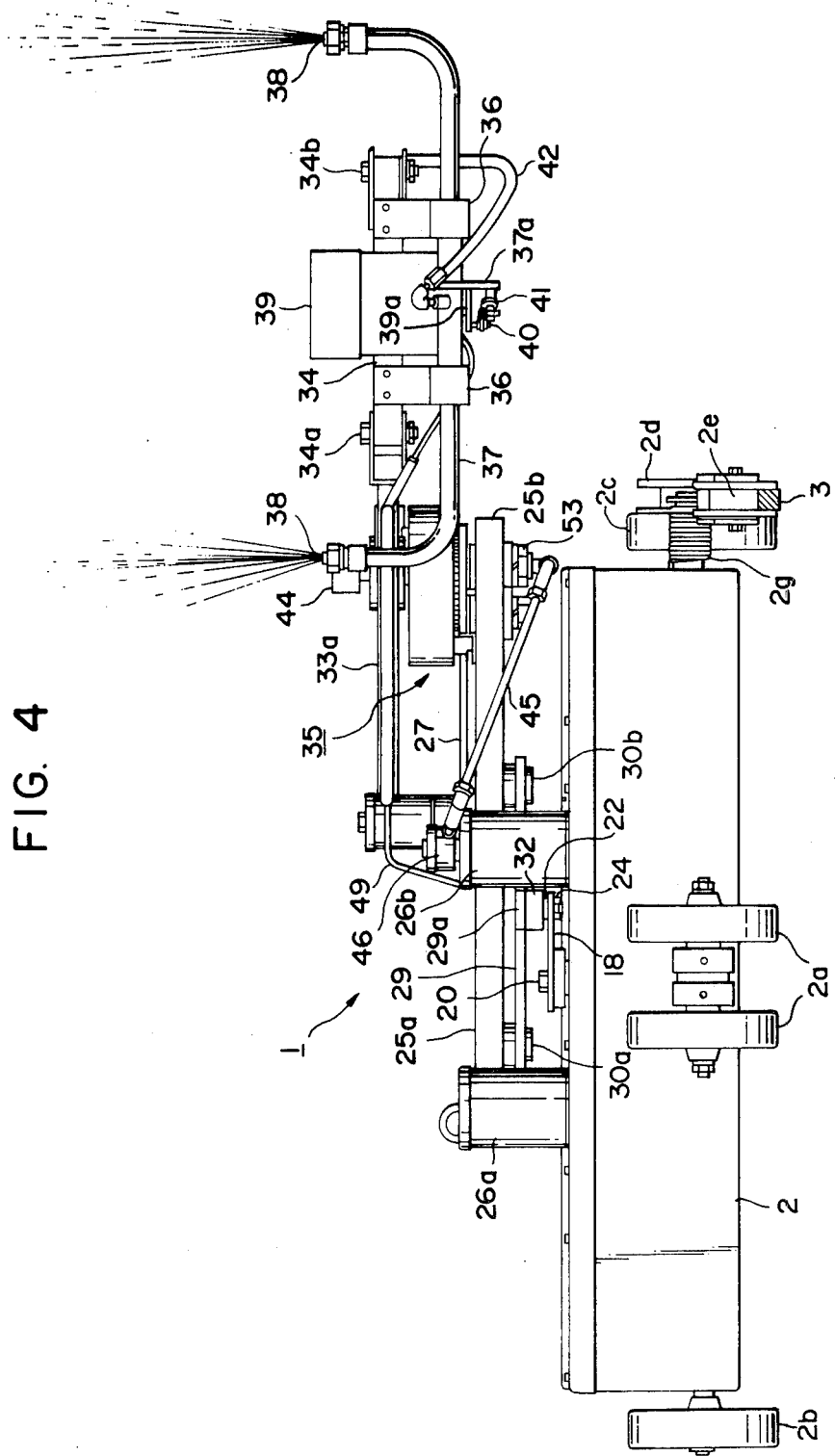
FIG. 4 is a front view of the fluid jet machine shown in FIG. 3.
Figure 5:
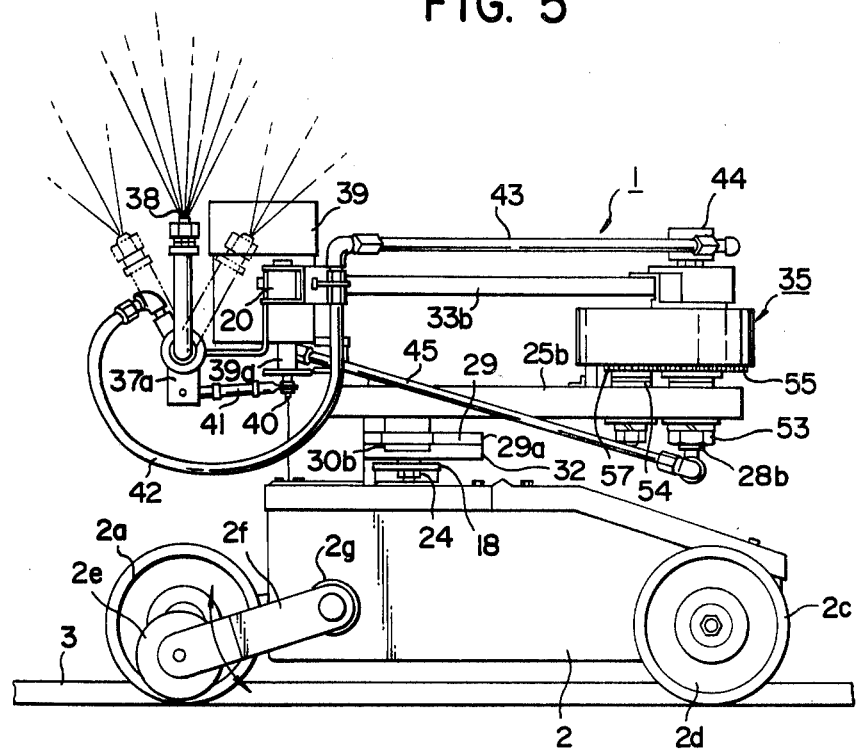
FIG. 5 is a right side view of the fluid jet machine shown in FIGS. 3 and 4.

In FIGS. 3-5, a truck 2 of the fluid jet machine 1 is supported by two front wheels 2a and two rear side wheels 2b and 2c. The truck 2 comprises two guide wheels 2d and 2e. The rear guide wheel 2d is coaxially fixed onto the rear wheel 2c. The front guide wheel 2e is supported by a support fork 2f which is pivotally mounted to a horizontal shaft projecting from the side of the truck 2 and the guide wheel 2e is pressed onto the guide rail 3 by a coil spring 2g surrounding the horizontal shaft.

An electric motor 4 with a motor shaft is arranged in the truck 2 covered by a cover, as shown in FIG. 3. A sprocket 5 is disposed on the motor shaft for rotating a drive shaft 9 via a chain 8 and a sprocket 10 fixed on the drive shaft 9.

Figure 6:
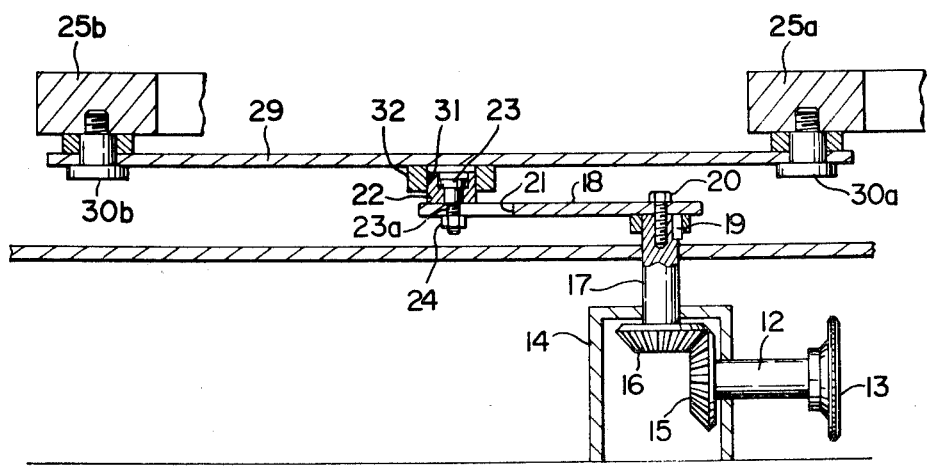
FIG. 6 is a longitudinal sectional view taken along the line VI—VI in FIG. 3.

A sprocket 7 is also disposed on the motor shaft via a torque limiter 6 for rotating a shaft 12 of an oscillating mechanism via a chain 11 and a sprocket 13 fixed on one end of the shaft 12. On the other end of the shaft 12, as shown in FIG. 6, a bevel gear 15 is fixed. A bevel gear 16 engages with the bevel gear 15 and is connected to the lower end of a crank shaft 17 which is perpendicular to the shaft 12.

The crank shaft 17 extends upwards through the cover of the truck 2. The upper end of the crank shaft 17 is fixedly connected to one end part of a crank plate 18 by a bolt 20 and a key 19.

A longitudinal slot 21 is formed in the other end of the crank plate 18 so that the radius of rotation of a roller 22 around the crank shaft 17 can be varied. The roller 22 is mounted to the end of the crank plate 18 by inserting the crank pin 23 through the roller 22 into the slot 21 and then engaging a nut 24 with the screw end of the crank pin 23 and tightening the nut 24.

In FIG. 3 there is shown a cross-shaped link member 29 for coupling the crank shaft 17 to a pair of arms 25a and 25b via the crank plate 18, the crank pin 23, the roller 22 and a pair of link pins 30a and 30b, each being pivoted to the intermediate position of each of the arms 25a and 25b.

The cross-shaped link member 29 includes a pair of projections 29a which project in the moving direction of the fluid jet machine 1. A link slot member 32 having a long link slot 21 is attached beneath the projections 29a. The roller 22 engages with the link slot 21.

Accordingly, as the crank shaft 17 is rotated, the cross-shaped link member 29 is moved to and fro in a direction substantially perpendicular to the moving direction of the fluid jet machine 1. Thereby, the pair of arms 25a and 25b, one end of each being pivotally mounted to the vertical cylindrical shafts 26a and 26b, respectively, are oscillated in the direction substantially perpendicular to the moving direction of the fluid jet machine 1, in the same direction as the cross-shaped link member 29. The cylindrical shafts 26a and 26b are vertically arranged in a front end of the truck 2.

The other ends of each of the arms 25a and 25b are pivotally connected one to each end of a rear link member 27 by a link pin 28a and a cylindrical shaft 28b. The pair of arms 25a and 25b and the rear link member 27 constitute the first parallel link mechanism.

One end of each of a pair of arms 33a and 33b is pivotally disposed to the link pin 28a and the cylindrical shaft 28b, respectively, in the upper part of the pair of arms 25a and 25b.

The other ends of each of the arms 33a and 33b are pivotally connected, one to each end of a front link member 34, by a pair of link pins 34a and 34b. The pair of arms 33a and 33b, the rear link member 27 and the front link member 34 constitute the second parallel link mechanism.

The arm 25b is also so connected to the arm 33b via an interlocking mechanism 35 comprising a plurality of gears as hereinafter referred to, that, when the first parallel link mechanism pivots through an angle of $\alpha$ with respect to the moving direction of the fluid jet machine 1, the second parallel link mechanism is also pivoted through a definite angle $\beta$ with respect to the first pivoting link mechanism. In the shown embodiment, $\beta$ is controlled always to be equal to $2 \times \alpha$, but other possibilities can be considered. Thereby the front link member 34 disposed to the front end of the second link mechanism is reciprocated in the direction perpendicular to the moving direction of the fluid jet machine 1.

A U-shaped pipe 37 is pivotally supported by a pair of bearings 36 which are connected to the front link member 34 by a pair of bars. A nozzle 38 for the jet of fluid is fixed to each upward-facing end of the U-shaped pipe 37.

An oscillating motor 39 is positioned on the middle of the front link member 34.

An output shaft 39a of the oscillating motor 39 is connected to a bracket 37a disposed to the lower side of the middle portion of the U-shaped pipe 37 via an eccentric pin 40 and a link rod 41, as shown well in FIGS. 4 and 5, so that the U-shaped pipe may pivot frontwards and backwards.

One end of a flexible tube 42 for fluid is connected to the U-shaped pipe 37 and the other end of the flexible tube 42 is joined to one end of a fluid pipe 43 which is arranged along the arm 33b. The other end of the fluid pipe 43 is connected to the top end of the cylindrical shaft 28b via a swivel joint 44.

The lower end of the cylindrical shaft 28b is connected to one end of a fluid pipe 45 placed along the arm 25b. The other end of the fluid pipe 45 is joined to the upper part of the cylindrical shaft 26b via a swivel joint 46. The lower end of the cylindrical shaft 26b is joined to one end of a flexible tube 47, the other end of which is taken out of the rear part of the truck 2, and is connected to a fluid pump (which is not shown) by way of a tube reel 48 as shown in FIG. 1.

An electric cord 49 for the oscillating motor 39 leads into the truck 2 through cord pipes attached along the arms 33a and 25a. The electric cord 49 and an electric cord for the motor 4 are taken out of the rear part of the truck 2 and then led to an electric source (not shown) via a cable reel 50.

Figure 7:
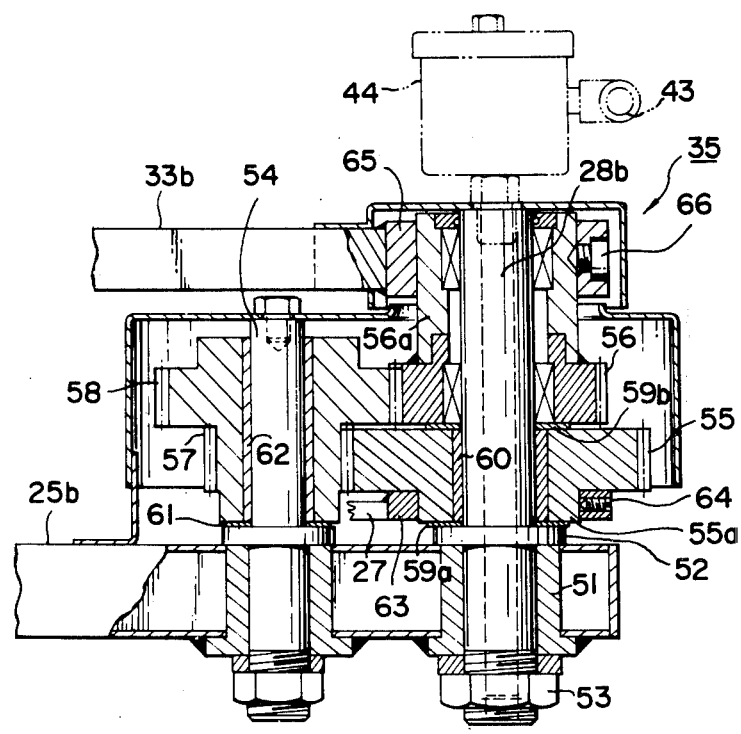
FIG. 7 is a longitudinal sectional view taken along the line VII—VII in FIG. 3.

Referring to FIG. 7, there is shown the interlocking mechanism 35.

The lower part of the cylindrical shaft 28b, with a screw part on its end, which includes a flange 52 in its intermediate portion, is fitted into an axial hole of a bush 51 mounted to the end of the arm 25b, and then is secured to the arm 25b by a nut 53.

A shaft 54 having a flange is also disposed beside the cylindrical shaft 28b in the same manner as the cylindrical shaft 28b. Two gears 55 and 56 are rotatably fitten on the cylindrical shaft 28b. A thrust bearing 59a is placed between the flange 52 of the shaft 28b and the gear 55, and also a thrust bearing 59b is placed between the gears 55 and 56.

Two gears 57 and 58 are rotatably fitted on the shaft 54 and are integrally connected to each other by certain means such as screws. A thrust bearing 61 is placed between the flange of the shaft 54 and the gear 57.

The gear 55 rotates around the cylindrical shaft 28b via an oil-less bearing 60 and engages with the gear 57. Then, the gear 58 integrally joined to the gear 57 rotates around the shaft 54 via an oil-less bearing 62 and engages with the gear 56. The gear 56 rotates around the cylindrical shaft 28b via a bearing.

The end of the rear link member 27 is secured to a boss 55a of the gear 55 via a ring 63 which is fitted on the boss 55a and fixed to it by a screw 64.

The end of the arm 33b is disposed to a boss 56a via a ring 65 by a screw 66, and the boss 56a is integrally joined to the gear 56.

Hence, when the arm 25b is pivoted by the cross-shaped link member 29, the gear 55 does not rotate, but the gear 57 rotates with reference to the gear 55 and then the gear 56 is rotated by the gear 58, and thereby the arm 33b is pivoted in connection with the gear 56.

The pivoting angle of the second parallel link mechanism may be changed by varying the ratios of the number of teeth of the gears 55, 56, 57, and 58. It may for example be made greater than, equal to, or smaller than the pivoting angle of the first parallel link mechanism. If desired, belts or chains may be used instead of the gears in the interlocking mechanism.

Figure 8A:
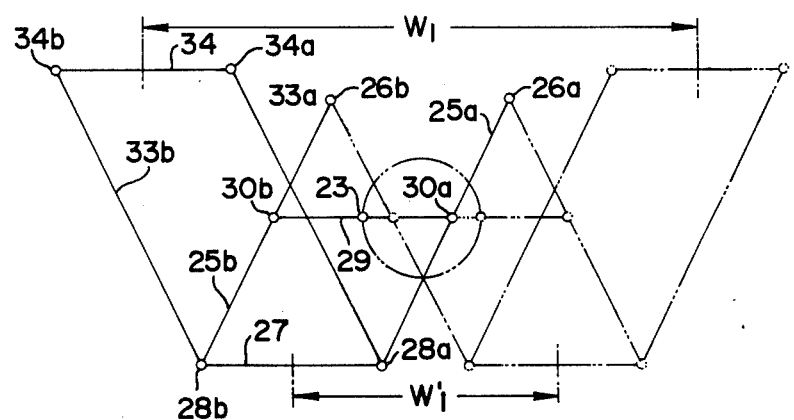
FIG. 8 is an explanatory view of an adjustment of the oscillating width of the nozzles by varying the mounting position of a crank pin to a crank plate.
Figure 8B:
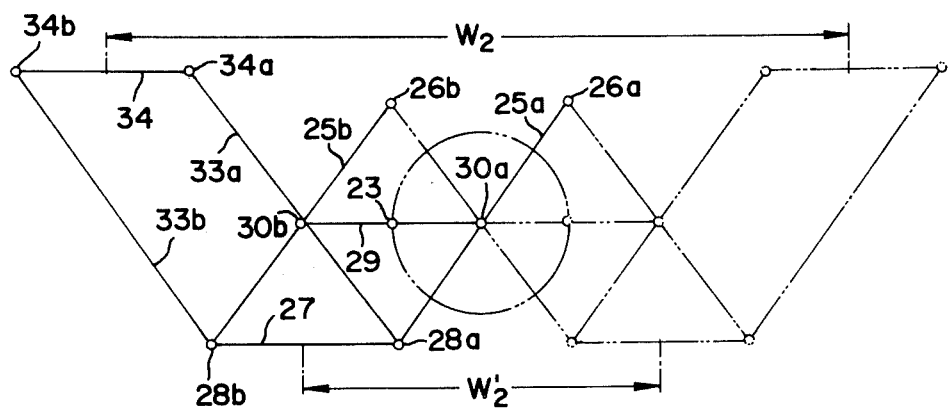

As shown in FIG. 8, the maximum pivoting widths $W_1$ and $W_2$ and $W_1'$ and $W_2'$ of the nozzles and the arms 25a and 25b respectively are adjustable by varying the radius of the roller 22 around the crank shaft 17 in order to match various uses.

The adjustment of the radius of the roller 22 may also be performed by selectively mounting it by the crank pin 23 into a plurality of holes formed radially on the crank plate 18, instead of in the long slot 21.

The operation of the fluid jet machine according to the present invention will now be explained.

The automobile is first raised by the lift A and then the motor 4 and the fluid pump (not shown) are switched on. The power of the motor 4 is transmitted to the drive shaft 9 via the sprocket 5, the chain 8 and the sprocket 10, and the fluid jet machine 1 starts to move along the guide rail 3.

The shaft 12 is also rotated by the motor 4 via the sprocket 7, the chain 11 and the sprocket 13. Then the crank shaft 17 is rotated by the shaft 12 via the bevel gears 15 and 16.

The cross-shaped link member 29 is oscillated in the direction perpendicular to the moving direction of the machine 1 by the crank shaft 17 via the crank plate 18, the crank pin 23, the roller 22 and the link slot member 32.

Thus, the first parallel link mechanism is oscillated in the direction perpendicular to the moving direction of the machine 1 by the cross-shaped link member 29, and then the second parallel link mechanism is oscillated in the same direction as the first parallel link mechanism via the interlocking mechanism 35 by the first parallel link mechanism. Thereby the nozzles 38 arranged in the front of the second parallel link mechanism are oscillated in the direction perpendicular to the moving direction of the machine 1.

On the other hand, the nozzles 38 jet fluid upwards, the fluid coming from the fluid tank via the flexible tube 47, the fluid pipes 43 and 45, the flexible tube 42 and the U-shaped pipe 37, while the nozzles are oscillated forwards and backwards by by the oscillating motor 29 via the eccentric pin 40 and the link rod 41.

When the truck 2 has reached the front end position, a stopper (not shown) detects and stops the truck 2 and switches on a reversing switch for the motor 4. The truck 2 then moves backwards, the oscillations occuring in the same manner as in the forward movement.

When the truck 2 has arrived at the rear end position, a limit switch (not shown) detects and switches off the motor 4 and the fluid pump.

The moving speed of the truck 2 may be adjusted by varying the output speed of the motor 4.

According to the present invention, it is possible to perform automatic, quick, and accurate operation. Further, a compact fluid jet machine is provided.

What is claimed is:

1. A fluid jet machine comprising:
   (a) a movable truck with a set of wheels;
   (b) a first parallel link mechanism coupled to the truck, said first parallel link mechanism comprising a pair of horizontal arms and a rear link bar, each end of which is pivotally connected to one end of each of the arms;
   (c) a second parallel link mechanism coupled to the first parallel link mechanism, said second parallel link mechanism comprising a pair of other horizontal arms, the rear link bar and a front link bar, one end of each of the other horizontal arms being pivotally connected to each end of the rear link bar, the other end of each of the other horizontal arms being pivotally connected to each end of the first link bar;
   (d) an oscillating mechanism arranged in the truck for oscillating the first parallel link mechanism;
   (e) an interlocking mechanism connected between the first and the second link mechanisms, which controls the pivoting angle of the second parallel link mechanism with respect to the first parallel link mechanism;
   (f) fluid jet nozzles disposed to the front end of the second parallel link mechanism; and
   (g) a motor for driving the truck and the oscillating mechanism.

2. A fluid jet machine according to claim 1, wherein the nozzles are oscillated with respect to the second parallel link mechanism by an oscillating motor.

3. A fluid jet machine according to claim 1, wherein the pivoting angle of the second parallel link mechanism is larger than that of the first parallel link mechanism.

4. A fluid jet machine according to claim 1, wherein the pivoting angle of the second parallel link mechanism is equal to that of the first parallel link mechanism.

5. A fluid jet machine according to claim 1, wherein the pivoting angle of the second parallel link mechanism is less than that of the first parallel link mechanism.

6. A fluid jet mechanism according to claim 1, wherein the oscillating mechanism comprises a crank shaft, a crank plate, a crank pin, a roller rotating around the crank plate, a crank pin, a roller rotating around the crank pin, and a cross-shaped link member for oscillating the first parallel link mechanism, the cross-shaped link member oscillating in the direction substantially perpendicular to the moving direction of the truck.

7. A fluid jet machine according to claim 6, wherein the fluid jet nozzles are connected to a U-shaped pipe disposed to the front end of the second parallel link mechanism.

8. A fluid jet machine according to claim 7, wherein the interlocking mechanism comprises a plurality of gear members.

9. A fluid jet mechanism according to claim 8, wherein the truck includes a pair of guide wheels in its one side, the guide wheels moving on a guide rail.

* * * * *